(12) United States Patent
Burnett (10) Patent No.: US 9,334,048 B2
(45) Date of Patent: May 10, 2016

(54) ELASTOMERIC BEARING HAVING TAPERED LAYERS

(71) Applicant: Bell Helicopter Textron Inc., Fort Worth, TX (US)

(72) Inventor: Michael C. Burnett, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 304 days.

(21) Appl. No.: 14/029,906

(22) Filed: Sep. 18, 2013

(65) Prior Publication Data
US 2015/0307187 A1 Oct. 29, 2015

(51) Int. Cl.
*B64C 27/00* (2006.01)
*B64C 27/35* (2006.01)
*F16C 27/06* (2006.01)
*F16F 1/41* (2006.01)

(52) U.S. Cl.
CPC ............ *B64C 27/35* (2013.01); *F16C 27/063* (2013.01); *F16F 1/41* (2013.01)

(58) Field of Classification Search
None
See application file for complete search history.

(56) References Cited

U.S. PATENT DOCUMENTS

| | | | |
|---|---|---|---|
| 3,071,422 A | 1/1963 | Hinks | |
| 3,862,812 A * | 1/1975 | Gorndt | B64C 27/35 416/134 R |
| 3,967,918 A | 7/1976 | Mouille et al. | |
| 3,999,887 A | 12/1976 | McGuire | |
| 4,115,031 A * | 9/1978 | Drees | B64C 27/001 244/17.27 |
| 4,142,833 A | 3/1979 | Rybicki et al. | |
| 4,257,739 A * | 3/1981 | Covington | B64C 27/35 416/134 A |
| 4,333,728 A * | 6/1982 | Drees | B64C 27/43 416/134 A |
| 4,477,225 A * | 10/1984 | Burkam | B64C 27/41 416/134 A |
| 4,566,856 A * | 1/1986 | Miller | B64C 27/33 416/134 A |
| 4,569,629 A * | 2/1986 | Ferris | B64C 27/32 416/134 A |
| 4,588,356 A | 5/1986 | Pariani | |
| 4,895,354 A * | 1/1990 | Byrnes | F16F 1/41 267/140.5 |
| 5,110,259 A * | 5/1992 | Robinson | F16F 1/393 144/144.1 |
| 5,601,408 A * | 2/1997 | Hunter | B64C 27/35 267/141.1 |
| 5,905,212 A * | 5/1999 | Moses | F16F 1/393 73/862.043 |
| 6,287,076 B1 | 9/2001 | Mouille et al. | |
| 6,296,444 B1 * | 10/2001 | Schellhase | B64C 27/32 416/134 A |
| 6,439,849 B1 * | 8/2002 | Sehgal | B64C 27/35 416/134 A |
| 6,523,708 B2 * | 2/2003 | Weckbecker | B66C 23/36 212/181 |
| 6,726,394 B2 * | 4/2004 | Garnier | B61F 5/24 403/132 |
| 6,827,553 B2 | 12/2004 | Jones et al. | |

(Continued)

FOREIGN PATENT DOCUMENTS

| | | |
|---|---|---|
| CN | 1214016 | 6/2001 |
| CN | 101936337 | 1/2011 |

OTHER PUBLICATIONS

Chinese Office Action in Chinese Application No. 201210376396.0 dated Aug. 27, 2014, 10 pages.

(Continued)

*Primary Examiner* — Medhat Badawi
(74) *Attorney, Agent, or Firm* — Noah A. Tevis (57) ABSTRACT

A rotor hub for an aircraft that includes a yoke, a rotor mast; and a hub spring assembly. The hub spring assembly includes an upper outer member; an upper inner member; and an upper spring member having a plurality of elastomeric layers and shim layers sandwiched between the upper outer member and the upper inner member, the shim layers being tapered such that a thickness of each shim layer is smaller at a side portion as compared to the thickness of the shim at a center portion.

12 Claims, 6 Drawing Sheets

(56) References Cited

U.S. PATENT DOCUMENTS

| | | | |
|---|---|---|---|
| 6,848,886 B2 | 2/2005 | Schmaling | |
| 7,097,169 B2* | 8/2006 | Mueller | B64C 27/35 267/140.4 |
| 7,368,158 B2 | 5/2008 | Herpin et al. | |
| 7,686,584 B2 | 3/2010 | Schmaling | |
| 7,850,429 B2 | 12/2010 | Pancotti | |
| 7,896,747 B2* | 3/2011 | Russell | F16C 7/04 464/70 |
| 3,029,371 A1 | 10/2011 | Stamps et al. | |
| 8,181,755 B2 | 5/2012 | Stamps et al. | |
| 8,257,051 B2* | 9/2012 | Stamps | B64C 27/32 416/134 A |
| 8,275,585 B2 | 9/2012 | Cunningham et al. | |
| 8,360,721 B2 | 1/2013 | Podgurski et al. | |
| 8,511,997 B2* | 8/2013 | Cunningham | B64C 27/35 267/141.1 |
| 8,764,300 B2* | 7/2014 | Errard | F03D 11/0008 384/452 |
| 8,882,462 B2* | 11/2014 | Schmaling | B64C 27/322 416/103 |
| 8,926,281 B2 | 1/2015 | Stamps et al. | |
| 8,956,117 B2 | 2/2015 | Stamps et al. | |
| 8,961,325 B2 | 2/2015 | Schofield et al. | |
| 9,010,679 B2 | 4/2015 | Sutton et al. | |
| 9,068,621 B1* | 6/2015 | Halladay | F16F 1/3605 |
| 9,085,357 B2 | 7/2015 | Davis et al. | |
| 2003/0235499 A1* | 12/2003 | Schmaling | F16F 1/393 416/134 A |
| 2004/0136829 A1* | 7/2004 | Jones | B64C 27/33 416/140 |
| 2004/0208745 A1* | 10/2004 | Schmaling | B64C 27/35 416/134 A |
| 2005/0001366 A1* | 1/2005 | Hederstierna | B60G 5/03 267/141.1 |
| 2006/0067823 A1* | 3/2006 | Pancotti | B64C 27/32 416/134 A |
| 2007/0137956 A1* | 6/2007 | Stamps | B64C 27/35 188/316 |
| 2009/0175725 A1* | 7/2009 | Podgurski | B64C 27/35 416/134 A |
| 2009/0268997 A1* | 10/2009 | Cunningham | B64C 27/35 384/418 |
| 2010/0009764 A1* | 1/2010 | Stamps | B64C 27/35 464/109 |
| 2011/0274548 A1* | 11/2011 | Stamps | B64C 27/35 416/174 |
| 2012/0257847 A1* | 10/2012 | Allred | B64C 27/35 384/221 |
| 2013/0121828 A1* | 5/2013 | Davis | B64C 27/35 416/134 A |
| 2013/0216384 A1* | 8/2013 | Stamps | B64C 27/35 416/174 |
| 2013/0341458 A1* | 12/2013 | Sutton | B64C 27/54 244/17.25 |
| 2014/0270610 A1* | 9/2014 | Schofield | B64C 27/41 384/220 |

OTHER PUBLICATIONS

European Search Report in European Application No. 13189561.7 dated Jan. 24, 2014, 7 pages.
Canadian Office Action in related Canadian Application No. 2,790,085 dated Jan. 16, 2014, 2 pages.
European Search Report in related European Application No. 12185110.9 dated Mar. 11, 2013, 6 pages.
Office Action in related U.S. Appl. No. 13/597,433 dated Jun. 25, 2015, 9 pages.
Final Office Action in related U.S. Appl. No. 13/597,433 dated Oct. 29, 2015, 7 pages.

* cited by examiner

ELASTOMERIC BEARING HAVING TAPERED LAYERS

BACKGROUND

1. Technical Field

The present disclosure relates to an elastomeric bearing, as well as a rotor hub incorporated the elastomeric bearing in a hub spring assembly.

2. Description of Related Art

Conventionally, rotor hubs have incorporated elastomeric bearings in a variety of the implementations. Typically, the elastomeric bearing includes constant thickness elastomeric layers and shim layers.

There is a need for an improved elastomeric bearing, as well as a rotor hub incorporating the improved elastomeric bearing.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
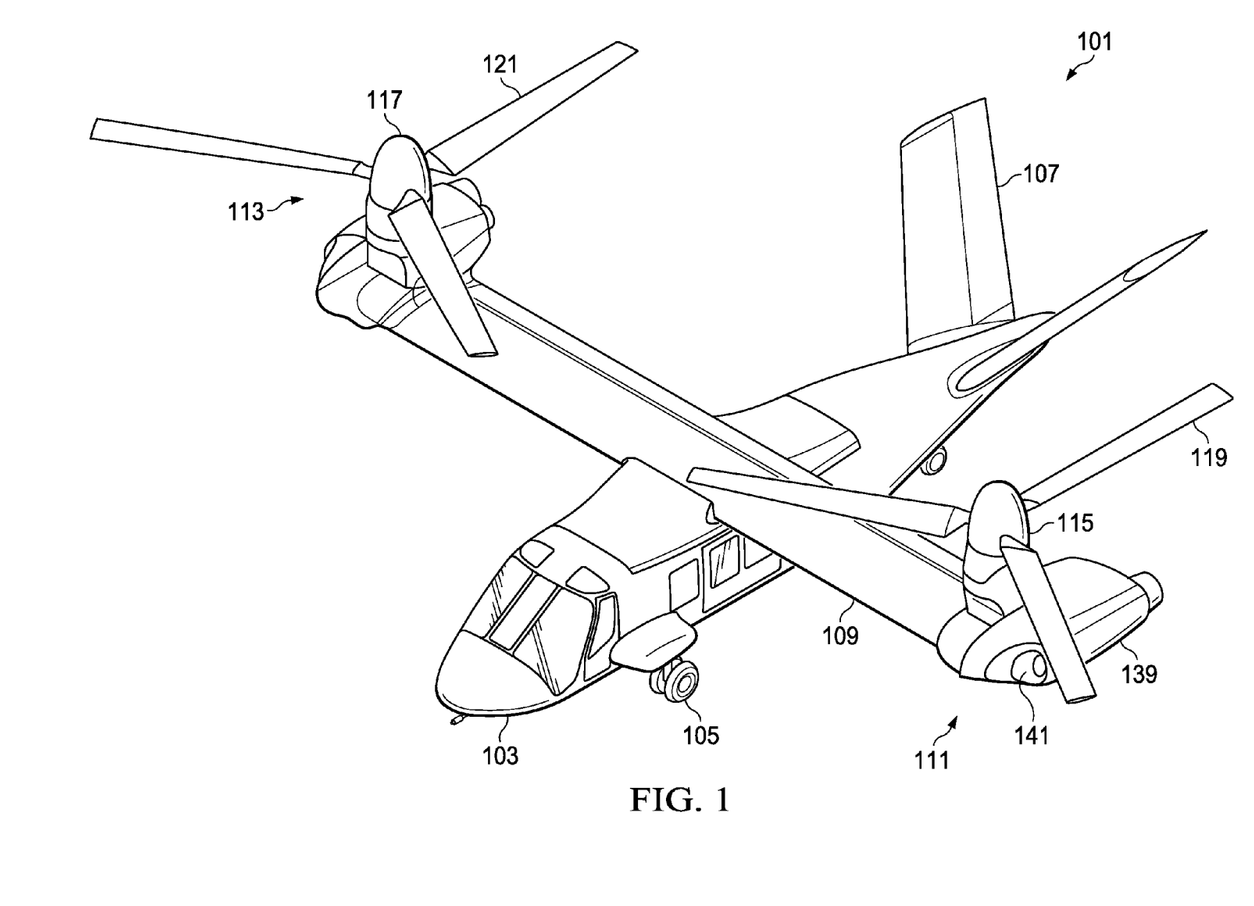
FIG. 1 is a perspective view of a tiltrotor aircraft, according to an example embodiment.
Figure 2:
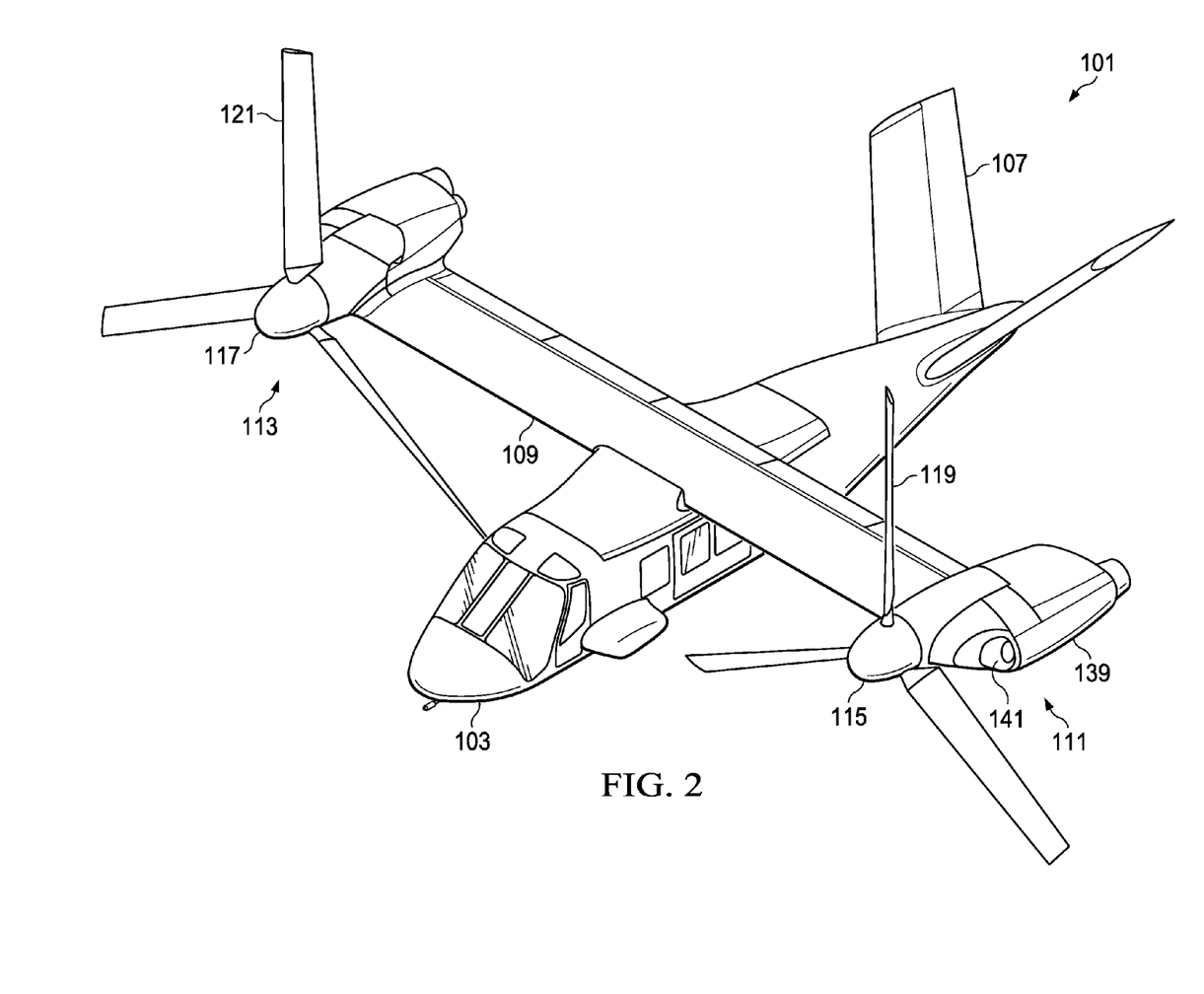
FIG. 2 is perspective view of a tiltrotor aircraft, according to an example embodiment.
Figure 3:
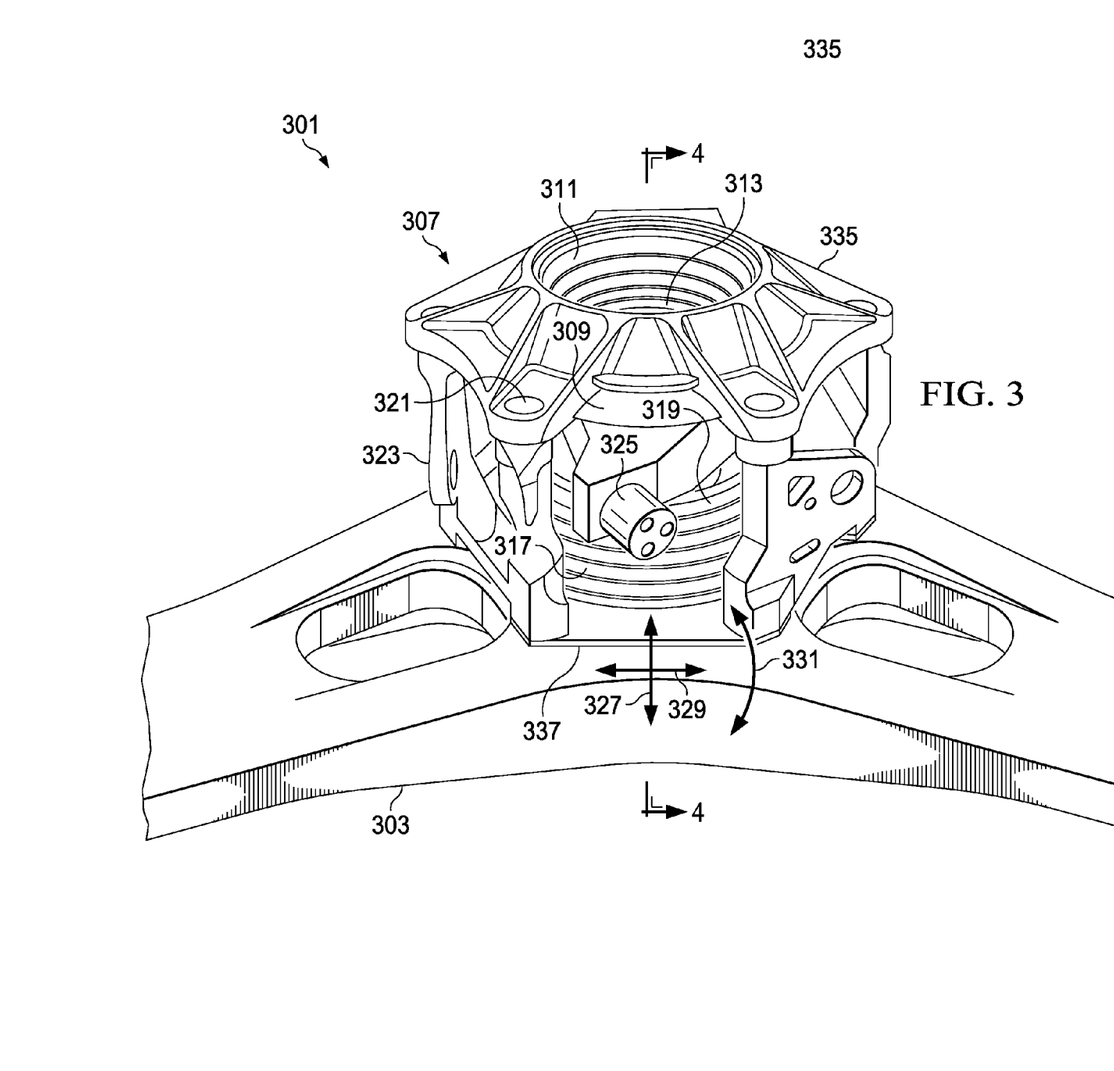
FIG. 3 is a perspective view of a rotor hub, according to an example embodiment.
Figure 4:
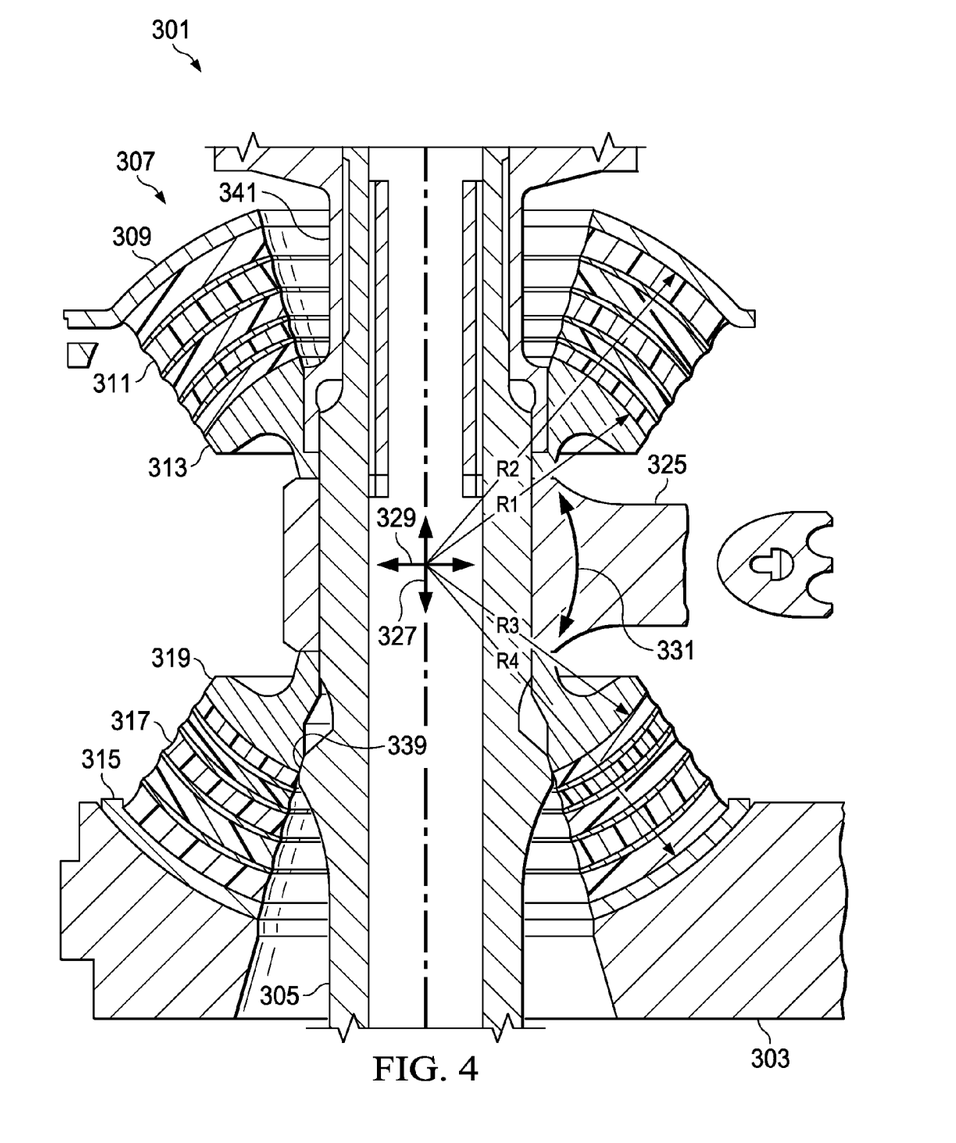
FIG. 4 is a cross-section cut view through a hub spring assembly portion of the rotor hub, taken a section lines 4-4 in FIG. 3, according to an example embodiment.

Referring to FIGS. 1 and 2 in the drawings, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111 and 113 includes a fixed engine and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode, in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

It should be appreciated that tiltrotor aircraft 101 is merely illustrative of a wide variety of aircraft that can implement the apparatuses disclosed herein, such as hub spring assembly 307. Other aircraft implementation can include hybrid aircraft, conventional rotorcraft, unmanned aircraft, gyrocopters, and a variety of other helicopter configurations, to name a few examples.

Referring now also to FIGS. 3-6, a rotor hub 301 of proprotor 115 is partially illustrated. Rotor hub assembly 301 includes a yoke 303 having three arms to which rotor blades 119 can be coupled thereto. It should be appreciated that alternative embodiments can include any desired amount of rotor blades 119, as such; the exact configuration of yoke 303 is implementation specific. A hub spring assembly 307 is coupled to a rotor mast 305 and yoke 303.

Hub spring assembly 307 includes an upper portion having an upper outer member 309, an upper spring member 311, and an upper inner member 313. Hub spring assembly 307 also includes a lower portion having a lower outer member 315, a lower spring member 317, and a lower inner member 319. Upper outer member 309, upper in member 313, lower outer member 315, and lower inner member 319 are rigid members. In contrast, upper spring member 311 and lower spring member 317 include alternating shim layers and elastomeric layers that are collectively configured to react operational loads through deformation of the elastomeric layers.

In the illustrated embodiment, the upper portion 309 is secured by an upper frame 335 that is coupled to the yoke 303 by a plurality of bolts 321 that also rigidly sandwich a plurality of pillow blocks 323 between the upper frame 335 and the yoke 303. An adapter 337 can be utilized between the pillow blocks 323 and the yoke 303, the adapter 337 also acting to secure the lower outer member 315 to the yoke 303. The lower inner member is secured to the rotor mast 305 by being partially sandwiched between trunnion 325 and a radial extension 339 of rotor mast 305. The upper inner member 313 is secured to rotor mast 305 by being partially sandwiched between trunnion 325 and a mast nut sleeve 341. The outer surface of upper inner member 313 forms a partial spherical surface having a radius R1. The inner surface of upper outer member 309 forms a partial spherical surface having a radius R2. In the illustrated embodiment, radius R1 is equal to radius R2, thereby forming a focal point for the motions of the hub spring assembly 307. The outer surface of lower inner member 319 forms a partial spherical surface having a radius R3. The inner surface of lower outer member 315 forms a partial spherical surface having a radius R4.

Torque from rotor mast 303 is rigidly transferred to yoke 303 via one or more trunnions, such as trunnion 325, which are coupled to pillow blocks 323 via one or more drive links (not shown for clarity). Such an arrangement prevents the upper spring member 311 and the lower spring member 317 from carrying torque between rotor mast 305 and yoke 303. It should be appreciated that torque can be carried between rotor mast 305 and yoke 303 with any variety of implementation specific devices.

The upper spring member 311 and the lower spring member 317 of hub spring assembly 307 are configured to react solely or in any combination: thrust forces in a thrust direction 327, shear forces in a shear direction 329, and moment forces in a moment direction 331. During operation, a collective change in pitch of rotor blades 119 can impart a thrust load between yoke 303 and rotor mast 305 that which upper spring member 311 and the lower spring member 317 of hub spring assembly 307 is configured to react. Similarly, a cyclic change in the pitch of rotor blades 119 can cause shear and moment loads between yoke 303 and rotor mast 305 which upper spring member 311 and the lower spring member 317 of hub spring assembly 307 is configured to react. It should be appreciated that other operational forces can also cause thrust, shear, and moment loads between yoke 303 and rotor mast 305.

Figure 5:
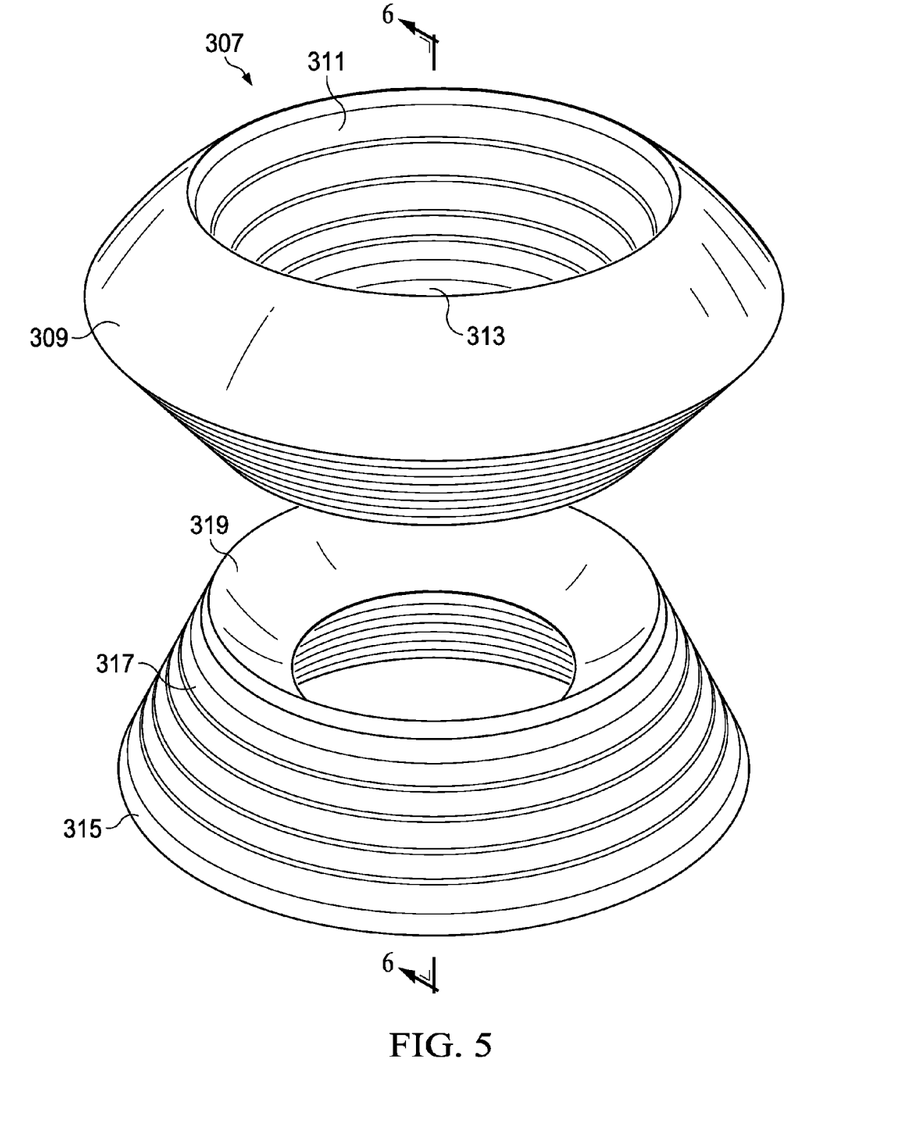
FIG. 5 is a perspective view of a hub spring assembly, according to an example embodiment.
Figure 6:
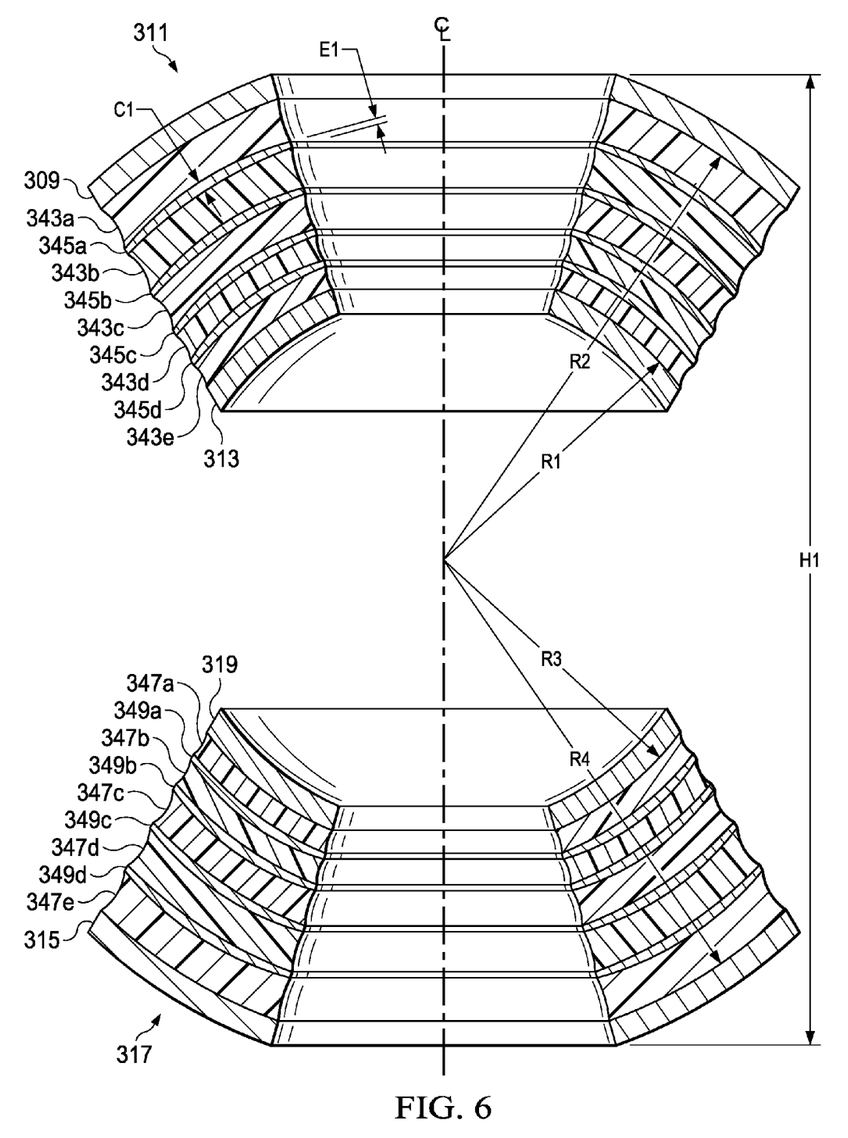
FIG. 6 is a cross-sectional view of the hub spring assembly, taken from section lines 6-6 in FIG. 5, according to an example embodiment.

Referring in particular to FIGS. 5 and 6, components of hub spring assembly 307 are illustrated in further detail. Upper spring member 311 includes alternating layers of elastomeric layers 343a-343e and shim layers 345a-345d. Similarly, lower spring member 317 includes alternating layers of elastomeric layers 347a-347e and shim layers 349a-349d. The exact material of elastomeric layers 343a-343e and 347a-347e is implementation specific; for example, elastomeric materials, such as rubber, can be formulated in a variety of implementation specific properties, such as elasticity. Further, it should be appreciated that shim layers 345a-345d and 349a-349d can be of any desired rigid material. In the preferred embodiment, the shim layers are of a metal material, but alternative embodiments can include other rigid materials, such as a composite material.

One feature in particular that provides significant benefits is that the elastomeric layers 343a-343e and shim layers 345a-345d, as well as elastomeric layers 347a-347e and shim layers 349a-349d, are shaped with an arc taper such that the exposed interior and exterior portions of the shim layers 345a-345d and 349a-349d have smaller thickness as compared to the center portion, conversely while the elastomeric layers 343a-343e and 347a-347e have larger thicknesses as the exposed edges as compared to the center portions. For example, shim layer 345a has a center thickness C1 at a center portion that is thicker than an edge thickness E1 of the edge portion. Further, the thickness transition between center thickness C1 and edge thickness E1 is an arc taper.

If the shim layers and elastomeric layers were of constant thickness instead of being tapered, the highest amount of strain in the elastomeric layers would be at the edges. In order to reduce the strain at the edges, the elastomeric layer thickness would need to be increased, but an increase in elastomeric layer thickness is a major challenge due to the clearance constraints within the rotor hub assembly. Further, the hub spring assembly 307 can become unstable at high cocking angles (moment loads) as the thickness of the elastomeric layers is increased, thus it is desirable to compactly package the hub spring assembly 307 and minimize the height H1. Further, one might be inclined to reduce the thickness of the metal shim layers, this however increases the bending in the shim layers, thereby increasing the propensity to crack and fail the entire hub spring assembly 307.

The arc taper in the elastomeric layers 343a-343e and shim layers 345a-345d, as well as elastomeric layers 347a-347e and shim layers 349a-349d, decreases the tensile strain in the elastomeric layers under high cocking angles and high loading as compared to any constant thickness elastomeric layers and shims. By reducing the peak tensile strain in the elastomeric layers, 343a-343e and 347a-347e, the ultimate cocking capability is improved.

The embodiments herein are illustrated with regard to a main rotor assembly on a rotorcraft; however, it should be appreciated that the embodiments may be adaptable to a tail rotor assembly.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A rotor hub for an aircraft, the rotor hub comprising:
   a yoke;
   a rotor mast; and
   a hub spring assembly, comprising:
      an upper outer member;
      an upper inner member; and
      an upper spring member having a plurality of elastomeric layers and shim layers sandwiched between the upper outer member and the upper inner member, the shim layers being tapered such that a thickness of each shim layer is smaller at a side portion as compared to the thickness at a center portion;
      wherein the shim layers are shaped with an arc taper such that the most interior portions of the shim layers and the most exterior portions of the shim layers have smaller thickness as compared to a center portion of the shim layers.

2. The rotor hub according to claim 1, further comprising:
   a trunnion;
   a pillow block;
   wherein torque is carried between the yoke and the rotor mast via the trunnion and the pillow block.

3. The rotor hub according to claim 2, wherein the upper outer member is a rigid member that is coupled to the yoke through the pillow block.

4. The rotor hub according to claim 1, the hub spring assembly further comprising:
   a lower outer member;
   a lower inner member; and
   a lower spring member having a plurality of elastomeric layers and shim layers sandwiched between the lower outer member and the lower inner member, the shim layers being tapered such that a thickness of each shim layer is smaller at a side portion as compared to the thickness at a center portion.

5. The rotor hub according to claim 4, wherein the lower outer member is a rigid member that is coupled to the yoke.

6. The rotor hub according to claim 4, wherein the lower outer member and the upper outer member are coupled together and coupled to the yoke.

7. The rotor hub according to claim 4, wherein the upper inner member and the lower inner member each having a partial spherical surface at a common radius.

8. The rotor hub according to claim 1, wherein the plurality of elastomeric layers and shim layers are tapered with an arc geometry.

9. The rotor hub according to claim 1, wherein the hub spring assembly is configured to react thrust loads, shear loads, and moment loads during operation of the aircraft.

10. The rotor hub according to claim 1, wherein the aircraft is a tiltrotor aircraft.

11. The rotor hub according to claim 1, wherein the aircraft is a helicopter.

12. The rotor hub according to claim 1, wherein the rotor hub is a main rotor hub for a helicopter.

* * * * *